Patented Sept. 25, 1928.

1,685,553

UNITED STATES PATENT OFFICE.

GILBERT MICHEL, OF BAGNEUX, FRANCE, ASSIGNOR TO HART O. BERG, OF PARIS, FRANCE.

SAND MOLD FOR CASTING MAGNESIUM AND PROCESS OF MAKING SAME.

No Drawing. Application filed February 5, 1925, Serial No. 7,157, and in France October 4, 1924.

When casting operations are to be performed with metals and alloys which are readily oxidized, for instance magnesium in the pure state or alloyed with other metals, it has been found that the use of molds employing the usual molding sands, will usually be attended with a spontaneous ignition of the metal or with excessive oxidation thereof, even if the mold has previously been properly dried. All traces of moisture are prejudicial to efficient working and the water of constitution even of the most silicious sands will thus be decomposed.

My invention relates to a process for the preparation of molding sands wherein this inconvenience is obviated. According to my process, the grains of sand are covered with a protecting film or layer which is inert to magnesium, and I incorporate therewith a suitable reducing substance, solid or liquid, capable of absorbing any oxygen which may be disengaged, in spite of the presence of the protecting layer upon the surface of the grains of sand.

In carrying the said process into effect, I may employ various substances either solid or liquid. As an example, indicative of my process, I may proceed as follows:

The protecting layer is formed on the surface of the sand grains by mixing them up with a substance which is inert with reference to magnesium and is not volatile at the melting point of this metal. I prefer to employ a gum such as a resinous substance dissolved in a volatile or a nonvolatile oil. The said resinous substance which thus covers the sand grains will protect them against the action of the molten magnesium, even after the oil has become volatilized.

The proportion of the resinous substance employed will depend essentially upon the nature of the sand. In the case of silicious sand which is particularly dry, the proper proportion will be from 2 to 2.5 per cent by weight of the rosin in solution in the requisite amount of oily liquid.

The sand is further mixed with a substance which has a greater affinity for oxygen (at the temperature to be used in molding the magnesium or alloy) than that possessed by magnesium, thereby preventing the oxidation of the magnesium. This reducing substance is preferably of such nature that when oxidized it will form a gas which is inert to magnesium.

I may, for instance employ hydrocarbons, and chiefly the hydrocarbons which are about as volatile as naphthalene $C_{10}H_8$ either in the liquid state or in the solid state (i. e., dissolved or melted) in fine powder. The naphthalene will readily absorb the oxygen which tends to form, and will protect the magnesium against all oxidation.

The proportion of naphthalene may vary within wide limits according to the sand employed, and the following proportions may be employed to advantage: for 30 kgs. of sand, 250 to 300 grammes of rosin=2.5 to 3%, 300 to 500 grammes of naphthalene in powder=3 to 5%.

But this will not prevent the suitable addition of a greater or less amount of agglomerating substances which may be considered necessary to strengthen the colloidal clay which is contained in green sand, or to give the desired consistency to sand which is exhausted.

Either of the two substances in use, i. e. the protecting substance or the reducing substance, may be separately employed; but the use of a protecting substance forming an inert protecting film upon the sand grains will not alone suffice as a rule to prevent all oxidation. The naphthalene in fine powder may even be employed alone in certain cases, but it is found to be insufficient for the purpose, and especially when large castings are to be made.

The present invention accordingly comprises firstly the separate use of either of the two above-mentioned means, and secondly their combined use, whereby in all cases, and even with the use of green sand, I am enabled to obviate all oxidation of the metal during the casting process.

I claim:—

1. A process for the preparation of molds for easily oxidizable metal, consisting in preparing a molding sand by incorporating in it rosin dissolved in a substance which does not liberate water on contact with the fused metal and forming the mold from said sand.

2. A process according to claim 1, of preparing a mold for casting easily oxidizable metals which comprises preparing a dried molding sand by incorporating rosin dissolved in an oil and forming a mold from the said sand.

3. A process for the preparation of a mold for casting easily oxidizable metals which comprises preparing a molding sand by incorporating in it rosin dissolved in a non-aqueous oily liquid and naphthalene, and forming the mold from the said sand mixture.

4. A process of preparing a mold for magnesium and alloys consisting largely of magnesium, which comprises first preparing well dried molding sand by incorporating about 2.5 to 3% of rosin, dissolved in hydrocarbon oil, and about 3 to 5% of naphthalene therewith, these percentages both being based upon the weight of the dry sand, and forming a mold from said sand.

5. A process of producing a mold for molding easily oxidizable molten metal consisting in large part at least of metallic magnesium, which comprises preparing molding sand by incorporating naphthalene therewith, and forming a mold from said sand.

6. A molding sand having its individual particles covered with rosin dissolved in a liquid inert to magnesium, and having incorporated in its mass a reducing agent of greater affinity for oxygen than has magnesium.

7. A molding sand for use in casting readily oxidizable metals, having a small percentage of naphthalene incorporated in its mass.

8. A molding sand for use in casting readily oxidizable metals, having a small percentage of naphthalene and of rosin incorporated in its mass.

9. A molding sand for use in molding magnesium and alloys containing magnesium as a major component, mixed with small amounts of naphthalene, rosin and oil.

10. A molding sand for use in molding magnesium and alloys containing magnesium as a major component, mixed with a small amount of rosin and a hydrocarbon having a reducing action at the temperature of molten magnesium.

In testimony whereof I have signed my name to this specification.

GILBERT MICHEL